(12) United States Patent
Kashihara et al.

(10) Patent No.: US 7,012,348 B2
(45) Date of Patent: Mar. 14, 2006

(54) ON-VEHICLE AC GENERATOR (75) Inventors: Toshiaki Kashihara, Tokyo (JP);
Yoshihito Asao, Tokyo (JP); Atsushi Oohashi, Tokyo (JP); Shougo Okamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/684,715

(22) Filed: Oct. 15, 2003

(65) Prior Publication Data

US 2004/0222710 A1   Nov. 11, 2004

(30) Foreign Application Priority Data

May 7, 2003   (JP)   ............................ P2003-129278

(51) Int. Cl.
*H02K 3/24* (2006.01)
(52) U.S. Cl. .......................................... 310/64; 310/43
(58) Field of Classification Search .................. 310/43, 310/52, 58, 64
See application file for complete search history.

(56) References Cited

U.S. PATENT DOCUMENTS

| | | | |
|---|---|---|---|
| 3,194,993 A | | 7/1965 | Hackney et al. |
| 3,400,454 A | | 9/1968 | Balke et al. |
| 3,979,822 A | * | 9/1976 | Halm ............................ 29/596 |
| 4,492,884 A | | 1/1985 | Asano et al. |
| 4,563,606 A | | 1/1986 | Fukasawa et al. |
| 4,959,570 A | * | 9/1990 | Nakamura et al. ............. 310/54 |
| 5,576,584 A | | 11/1996 | Kusumoto et al. |
| 6,201,321 B1 | * | 3/2001 | Mosciatti et al. ............. 310/43 |
| 6,268,678 B1 | | 7/2001 | Asao et al. |
| 6,366,000 B1 | | 4/2002 | Higashino et al. |
| 6,501,205 B1 | * | 12/2002 | Asao et al. ................... 310/184 |
| 6,633,098 B1 | * | 10/2003 | Inaba et al. ................... 310/58 |
| 6,756,710 B1 | * | 6/2004 | Bourqui et al. ............... 310/44 |
| 6,787,950 B1 | * | 9/2004 | Heim ........................... 310/64 |
| 6,809,437 B1 | * | 10/2004 | Oohashi et al. ............... 310/45 |
| 2003/0042806 A1 | * | 3/2003 | Inaba et al. ................... 310/58 |

FOREIGN PATENT DOCUMENTS

| | | |
|---|---|---|
| EP | 1 037 361 A | 9/2000 |
| JP | 07-255140 A | 3/1995 |
| JP | 2001-211590 | 3/2001 |
| JP | 2001-119883 A | 4/2001 |
| JP | 2001-218405 A | 8/2001 |
| JP | 2002-218695 A | 8/2002 |

* cited by examiner

*Primary Examiner*—Darren Schuberg
*Assistant Examiner*—Nguyen Hanh
(74) *Attorney, Agent, or Firm*—Sughrue Mion, PLLC (57) ABSTRACT

An on-vehicle AC generator that comprises a rotor; and a stator including a cylindrical stator iron core in which a plurality of slots extending in axial direction of a shaft are formed to be circumferentially aligned, and which is fitted to and supported in a case to contain the rotor therein, and a stator winding wound about the slot of the stator iron core, and which possesses a high rigidity to secure no deformation by force applied at the time of being fitted to the case. An insulating resin having adhesive properties is applied to an entire surface of the coil end portions. A corner portion formed by outer circumferential surface of the bottom of the coil end portions and an end face in axial direction of the stator iron core is also filled with the adhesive insulating resin.

8 Claims, 7 Drawing Sheets

ON-VEHICLE AC GENERATOR

BACKGROUND OF THE INVENTION

1. Field of the Invention

The present invention relates to an on-vehicle AC generator driven by, for example, an internal combustion engine and, more particularly, to a stator structure of an on-vehicle AC generator mounted on a vehicle such as automobile or truck.

2. Description of the Related Art

Generally, in a conventional stator of an on-vehicle AC generator, an iron core (core) of a predetermined laminate length (i.e., a predetermined thickness in laminating direction) is made by laminating steel plates each of which is approximately 0.5 mm in thickness; a large number of slots opening toward a rotary shaft of the rotor, which are located inside an inner circumference of the stator, are provided; and a variety of windings, which comply with specification of the generator, are accommodated within the mentioned slots.

Furthermore, for example, as shown in FIG. 3 of the Japanese Patent No. 3256696, configuration of a stator iron core (also referred simply to as core) is cylindrical, and slots, which include openings toward a center, are provided circumferentially on the inner surface side of f the stator iron core.

Since a non-slot portion, being an outer circumferential portion of the tubular stator iron core (core), (i.e., slot bottom portion, and also referred to as core back) needs only to possess thickness for a magnetic circuit, the non-slot portion is not constructed to have so large thickness. Moreover, the whole structure is of a sheet laminate in axial direction of the stator iron core (core), and therefore it is sometimes the case that the stator iron core is fragile under the force in radial direction.

In particular, this problem is outstanding in a stator that is provided with a larger number of slots with substantially the same outside dimension of the core.

However, a support portion in order to cause a bracket serving as a casing to firmly support the stator is usually a part (e.g., outer circumferential portion) of the stator iron core (core), and accordingly a force is applied directly to the stator iron core (core) at least at the time of assembling.

When the end portion of an axial direction of the stator iron core (core), which is formed into a cylindrical shape by laminating steel plates, is fitted to an inner circumferential surface of a bowl-shaped bracket, a deformation force in radial direction and a force in a direction of stripping off a laminate layer at the shaft end of the stator iron core (core) is applied to the stator iron core (core).

Further, in the case of a stator iron core in which an end portion of the stator iron core (core) is provided with by step for sufficient fitting, the core back is made even smaller in thickness, and the increase in degrees of deformation is conceivable as well.

On the other hand, conventionally, an insulating resin that is provided at a portion (i.e., coil end) of a stator winding (also referred simply to as coil) protruding from the stator iron core (core) has its primary object to provide insulation from the other parts. Therefore, the insulating resin is provided just for thinly covering the surface of the strand.

Further, the insulating resin is provided (applied), being intended to ensure insulation between the stator winding (coil) housed in a bundle within a narrow slot and the stator iron core (core). In some cases, the insulating resin just adheres secondarily to the coil end, and not all the coil ends are covered with the insulting resin.

The Japanese Patent No. 3256696 discloses an insulating resin covering the whole coil ends of an aligned continuous winding.

This art intends to uniformize heat radiation of a coil end. There is no detailed description concerning a state of resin in the coil end, the state of the core end portion, a state of resin within a slot or the like.

Although it is disclosed in this prior art that a component having a higher thermal conductivity than a base resin is mixed into a base resin as an insulating resin, this disclosure relates to the heat radiation toward an outer perimeter surface of the coil end. There is no disclosure regarding correlation between the insulating resin and the end support portion of the stator iron core (core).

In addition, the mentioned aligned continuous winding means "winding manufactured in the following way. A plurality of windings are prepared each of which is made by folding a continuous strand outside of the slot on the side of both end faces of the stator iron core (core) and winding about the slots so as to get through alternately inner layer and outer layer in depth direction of the slot within the slots for each predetermined number of slots. This plurality of windings consists of at least one set of winding group formed by folding at the same time plural strands. Further, the winding group is aligned at a pitch of a predetermined number of slots so that straight-line portions may be connected with a turn portion." (See Paragraph 0015 of the Japanese Patent No. 3256696)

Moreover, the Japanese Patent Publication (unexamined) No. 218695/2002 discloses ratio of the winding conductor and the insulating resin occupying in axial cross sectional area of contour of a connecting part (circumferential connection part) of a part extending from the core of the coil end. It is also disclosed in this prior art to intend improvement both in rigidity of the whole stator and in cooling capability of the stator winding (coil).

Further, the Japanese Patent Publication (unexamined) No. 218405/2001 discloses an insulating resin having a high vibration damping factor, achieved.

Likewise, the Japanese Patent Publication (unexamined) No. 255140/1995 discloses an art in which a resin possessing a predetermined elastic characteristic is provided between coil strands and/or between iron core and coil. It is also disclosed in this prior art that a damping factor of vibration is made high by increasing rigidity of an excitation portion (especially, stator iron core) thereby achieving reduction in electromagnetic noise.

Further, the Japanese Patent Publication (unexamined) No. 119883/2001 discloses a resin provided to fill up gaps at the coil end, being a conductive segment. It is intended in this prior art to achieve improvement in cooling capability by performing a forced-cooling with cooling means, as well as to ensure insulation performance and withstand pressure to earthquake, and reduction in wind noise.

The Japanese Patent Publication (unexamined) No. 119883/2001 discloses a manufacturing method in which a resin is mounted on the coil end by fluidized dipping, thereby easy control of interface and easy working are achieved. Any internal state of the slot, however, is not explicitly described in this art.

On the other hand, in a conventional laminate core made by laminating steel plates, coil is inserted into slots, and thereafter a rustproof coating is applied to the entire surface of the coil thereby achieving reliability and durability at the time of being mounted on the generator.

For fitting such a laminate core to the bracket, in one method, an inner circumferential surface of the bracket is fitted to an outer circumference of the laminate core in the state of having been coated with a rust inhibitor; while in another method, fitting is performed after both end portions of an axial direction of the laminate core is machined by step machining for positioning of the fitting.

In the former method, the inner circumferential surface of the bracket is fitted to the laminate core while the portion, which is coated with the rust inhibitor, of an axial end of the outer circumference of the core is being chipped off to some extent.

In the latter method, a place of the laminate core, to which axial end portion of the bracket is fitted, has been preliminarily chipped off toward inner circumference side, and a base of the steel plate on an axial surface and on a radial surface is exposed forming an L shape.

Although dimensional fitting of both members is easy, the bracket applies a fitting force to the laminate core in the exposed state, and therefore stripping-off one laminate from another is likely to occur. In this case, the laminate core is easy to corrode.

Actually, a problem exits in that water is likely to be retained at the boundary between the machined portion of the core axial end and the fitted portion of the bracket, and the stator (core part) is enlarged toward the axial side due to spread of rust at this boundary portion eventually locking the rotor rotating inside the inner circumference.

As described above, in the conventional stator for a on-vehicle AC generator, any rigidity of stator conforming to a support structure (bracket) is not ensured, and a rigidity to be performed by a support portion of the axial end surface of the core (that is, end surface portion of the core to be fitted to the bracket) is low. Therefore, deformation at the time of press-fitting the core in axial direction of the bracket (i.e., fitting to the bracket) may occur at the time of assembling, or stripping off the laminated steel plates, slip of the laminates or the like may occur. As a result, a further problem of poor withstand pressure or corrosion is easy to occur. Moreover, a problem exists in that any electromagnetic noise due to deformation is increased.

SUMMARY OF THE INVENTION

The present invention was made to solve the above-discussed problems and has an object of providing a highly reliable on-on-vehicle generator in which stator is improved in rigidity and is not deformed when fitted to a bracket, and any disadvantage of poor withstand pressure, corrosion or the like occurs.

Another object of the invention is to provide a high-quality on-on-vehicle generator in which any increase in electromagnetic noise due to deformation occurs.

An on-vehicle AC generator according to the invention comprises:

a shaft rotatably supported in a case;

a rotor fixed to the shaft; and a stator including a cylindrical stator iron core in which a plurality of slots extending in axial direction of the shaft are formed so as to be aligned circumferentially, and which is fitted to and supported in the case so as to contain the rotor therein; and a stator winding consisting of multiphase AC windings, which are wound about the slots of the stator iron core.

Furthermore, in this on-vehicle AC generator:

the stator winding of the stator includes coil end portions extending from two end faces in axial direction of the stator iron core; and an insulating resin having adhesive properties is applied to an entire surface of the coil end portion; as well as a corner portion formed by intersection of an outer. circumferential surface of a bottom of the coil end portions and an end face in axial direction of the stator iron core is also filled with the insulating resin having adhesive properties.

As a result, according to the on-vehicle AC generator of the invention, a highly reliable on-on-vehicle generator can be achieved, in which the stator is improved in rigidity, thereby occurring no deformation at the time of being fitted to the bracket (case), and any poor withstand pressure, corrosion or the like does not occurs. In addition, a high-quality on-vehicle generator without occurrence of increase in electromagnetic noise due to the deformation can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, several preferred embodiments according to the present invention are described referring to the drawings.

In addition, like reference numerals refer to like or equivalent parts throughout the drawings.

Embodiment 1

Figure 1:
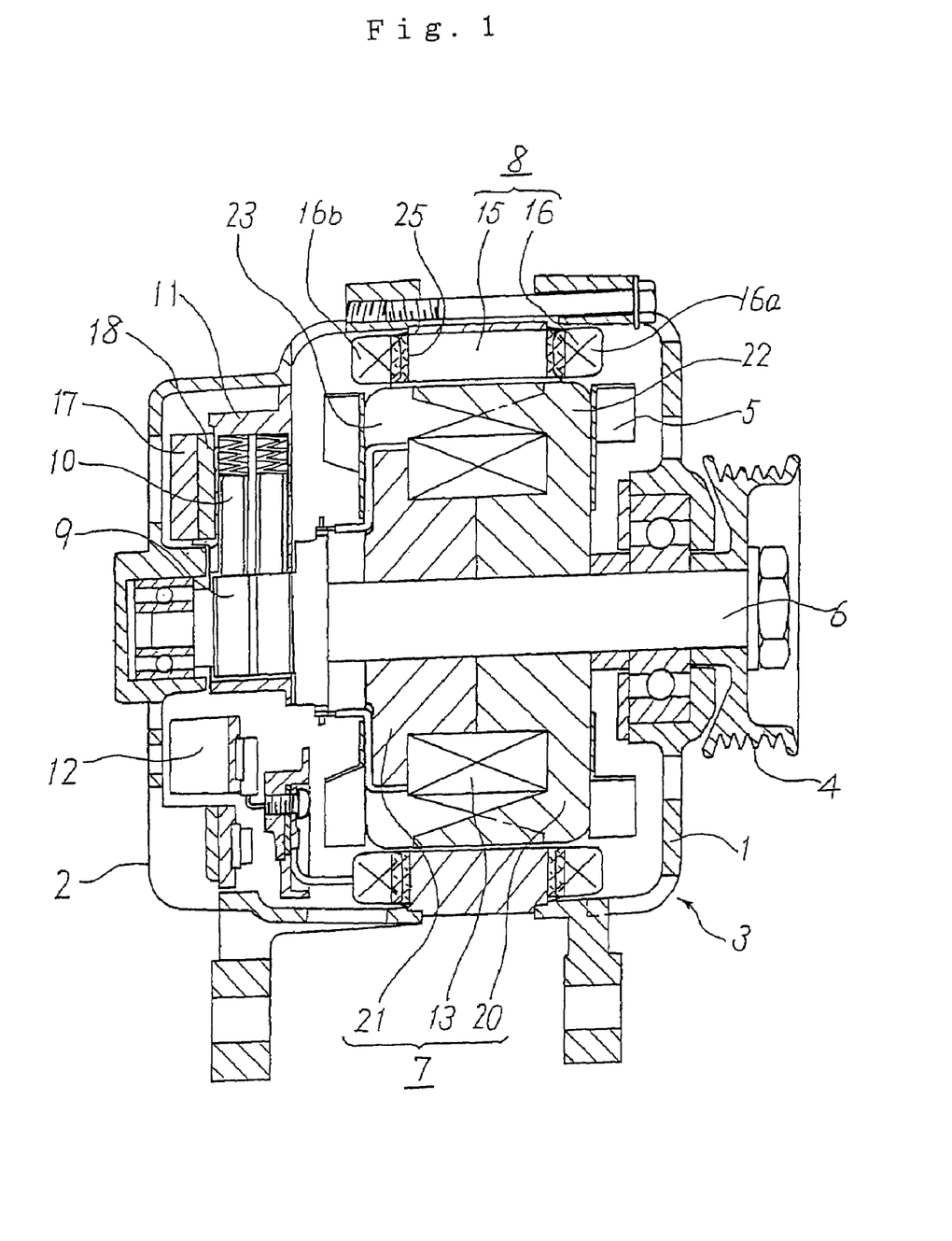
FIG. 1 is a cross sectional view showing an overall construction of an on-vehicle AC generator according to a first preferred embodiment.

FIG. 1 is a cross sectional view showing a construction of an on-vehicle AC generator according to a first preferred embodiment.

Figure 2:
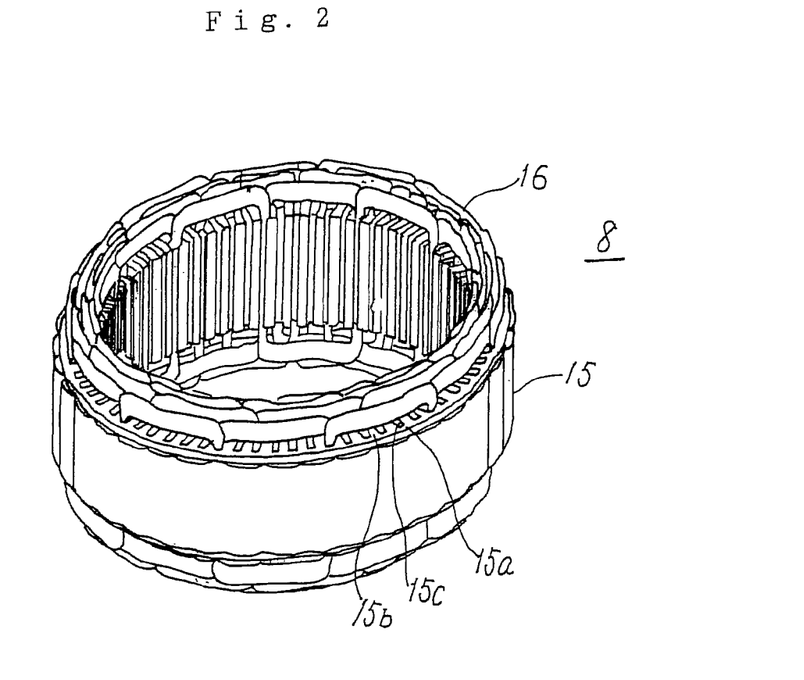
FIG. 2. is a perspective view before application of an insulating resin in a stator applied to the on-vehicle AC generator according to the first embodiment.

FIG. 2 is a perspective view before applying an insulating resin to a stator of the on-vehicle AC generator according to the first embodiment.

Figure 3:
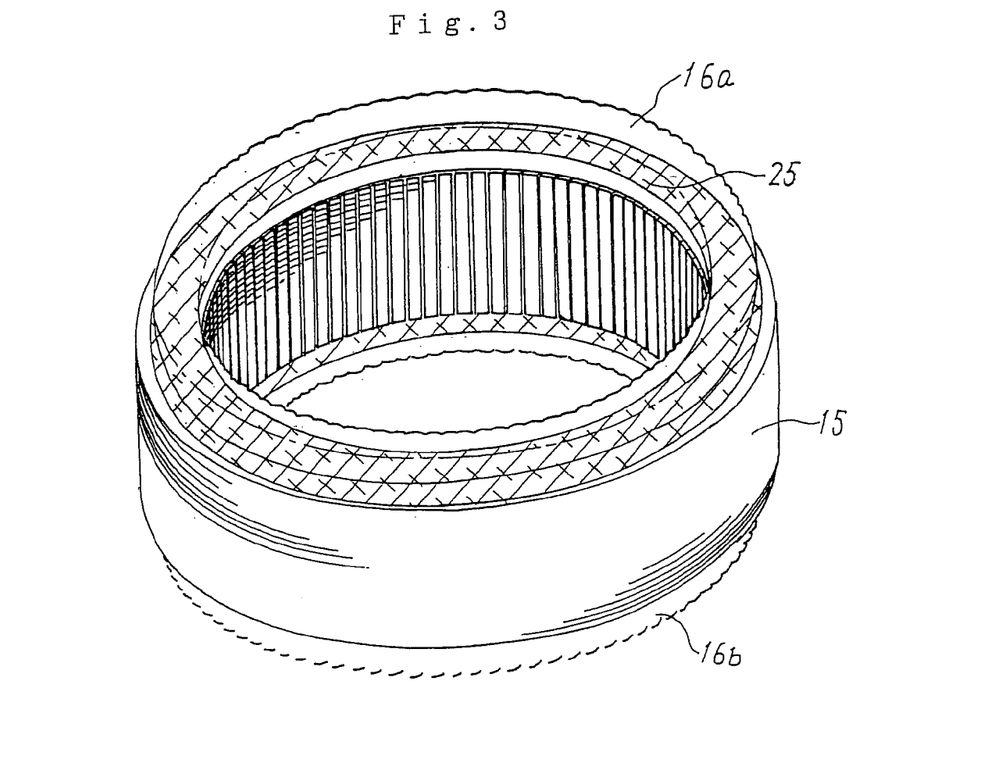
FIG. 3 is a perspective view showing the state that the insulating resin has been applied in the stator applied to the on-vehicle AC generator according to the first embodiment.

In addition, FIG. 3 is a perspective view conceptually showing the state that the insulating resin has been applied to between a coil end bottom and core end of the stator of the on-vehicle AC generator according to the first embodiment.

First, the whole construction of the on-vehicle AC generator according to the first embodiment is described with reference to FIG. 1.

The on-vehicle AC generator according to the first embodiment comprises: a case 3 consisting of a front bracket 1 and a rear bracket 2 that are made of aluminum; a shaft (rotary shaft) 6 provided within this case 3, and in which a pulley 4 is fixed to one end portion thereof; a rotor 7 fixed to this shaft 6; and a cooling fan 5 fixed to both end portions of an axial direction of the rotor 7; a stator 8 fixed to the case 3 so as to surround the rotor 7; a slip ring 9 fixed to the other end portion of the shaft 6 to supply current to the rotor 7; a pair of brushes 10 sliding on the surface of the slip ring 9; a brush holder 11 for accommodating these brushes 10; a rectifier 12 that is electrically connected to the stator 8 and rectifies an alternating current having been generated at the stator 8 to a direct current; and a regulator 18 that is mounted to a heat sink 17, which is fitted to the brush holder 11, and regulates level of an alternating voltage having been generated at the stator 8.

The rotor 7 is provided with a field winding 13 that is fed with current to generate a magnetic flux, and a pair of pole cores 20, 21, which are provided so as to cover the field winding 13, and at which magnetic poles are formed due to the mentioned magnetic flux.

Furthermore, the pair of pole cores 20, 21 are made of iron. Pawl-shaped magnetic poles 22, 23, of which outermost diameter surface shape is substantially trapezoidal respectively, are provided extending equiangularly at an outer edge portion spaced circumferentially. This pair of pole cores 20, 21 are disposed facing each other so that these pawl-shaped magnetic poles 22, 23 may be engaged with each other to be fixed to the shaft 6.

The stator iron core (core) 15 is provided with a cylindrical base (core back) 15a; a plurality of teeth parts 15b formed equiangularly spaced circumferentially on an inner circumferential surface of the base 15a respectively; and a plurality of slots 15c extending in an axial direction that are formed with the base 15a and adjacent teeth parts 15b.

As shown in FIG. 2, a stator winding 16 is constructed of three phases of windings in which each phase conductive wire, which is made by coating a copper wire (electric conductor) with an insulating material, is wound, at a predetermined number of turns in an wave-like manner, about the slots 15c disposed at predetermined number of slots apart so as to protrude out of one slot 15c to an end face side of the stator iron core (core) 15, and may extend circumferentially to enter the next slot 15c spaced a predetermined number of slots (six slots in the example of FIG. 2) apart.

Furthermore, the winding of each phase is wound about the stator iron core (core) 15 so that the slots 15c, to which each phase winding is wound, maybe staggered, being overlapped by one slot.

In addition, as shown in FIG. 3, a coil end portion (a coil end portion 16a on the front side and a coil end portion 16b on the rear side) of the stator winding (coil) 16 of the stator 8 of the on-vehicle AC generator according to this first embodiment, is filled with an insulating resin (for example, varnish) having high adhesive properties leaving no space at a bottom portion protruding from an end face in axial direction of the stator iron core (core) 15. Thus mechanical strength of a support portion (specifically, portion fitted to the bracket), to which force is applied inevitably at the time of assembling, is enforced.

Since the bottom of the coil end portion and the core end face portion are filled leaving no space with an adhesive insulating resin (such as varnish), the bottom of coil and the adhesive insulating resin form an integral unit, and the whole integral unit plays a role such as annular mass body thickened in axial and radial direction.

As described above, in the stator of the on-vehicle AC generator according to this first embodiment, an insulating resin (for example, varnish) having high adhesive properties is applied leaving no space to the bottom of the coil end portion (specifically, the coil end portion 16a on the front side and the coil end portion 16b on the rear side) of the stator winding (coil) 16 as well as to the end face portion in axial direction of the stator iron core (core) 15. As a result, the bottom coil and the varnish become an integral unit, and the integral unit plays a role such as annular mass body thickened in axial and radial direction.

As described above, according to this first embodiment, there is provided an insulating resin having high adhesive properties adjacent to an annular support portion of the stator iron core (core) 15 (specifically, surface fitted to the bracket) As a result, a high rigidity of a support structure is achieved, and deformation due to force applied through the bracket not only at the time of assembling but also at the time of shipping and being mounted on the vehicle is suppressed.

In particular, in the case where the stator iron core (core) is provided with relatively a large number of slots, the presence of an insulting resin is effective in ensuring rigidity of the stator iron core (core).

Furthermore, improvement in rigidity enables to achieve reduction inn electromagnetic noise.

In addition, the process of applying an insulting resin (varnish) is as follows. Likewise in the conventional method, the insulating resin (varnish) is dropped from an outer circumferential side of the coil end, and the whole coil end portions and voids within the slots are filled therewith while the stator iron core (core) being rotated about a retained rotary shaft.

Figure 4:
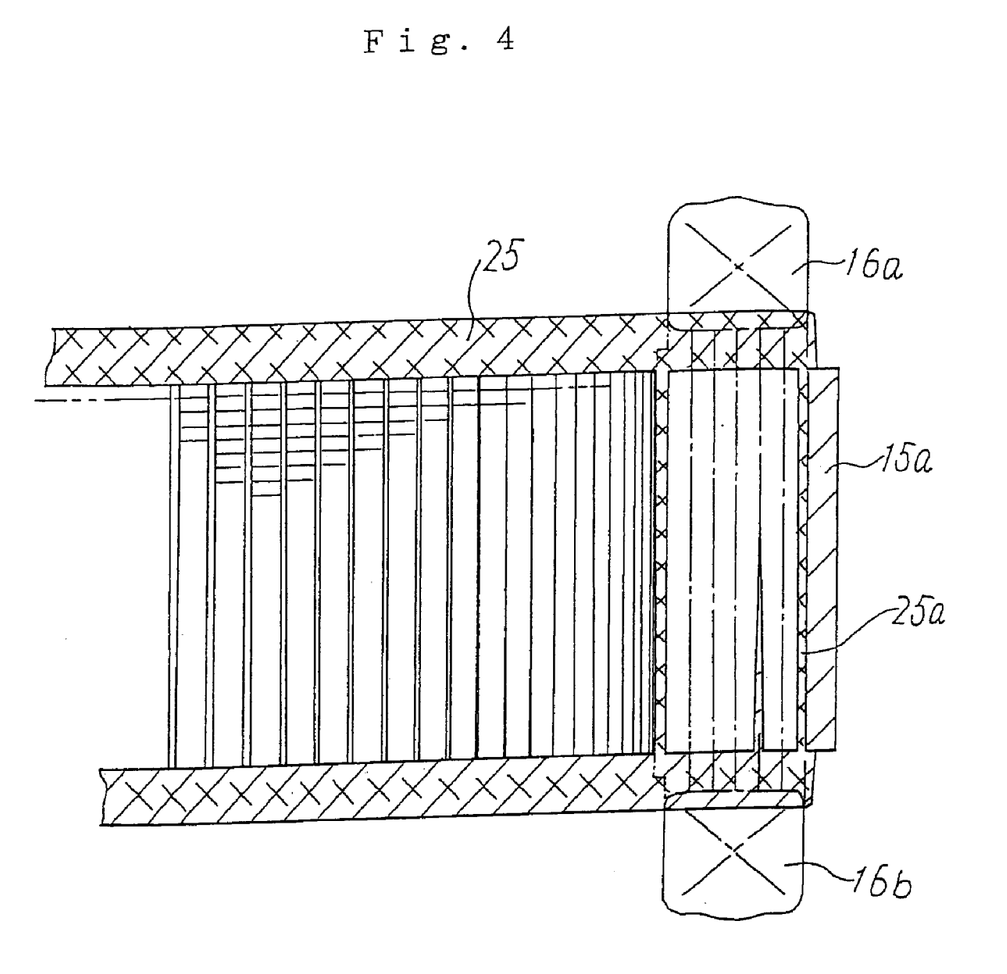
FIG. 4 is a view showing the state that the insulating resin is filled into the bottom of a coil end and in voids within a slot in the stator applied to the on-vehicle AC generator according to the first embodiment.

FIG. 4 is a cross sectional view conceptually showing the condition in which the bottom portions of the coil end and voids within the slot are filled with an insulating resin (varnish).

Note that, to show a winding pattern of the coil end, the insulting resin (varnish) covering the entire of the coil end portions is not illustrated.

With reference to FIG. 4, reference numeral 15a designates the base (core back) of the stator iron core (core) 15. Numeral 16a designates the coil end portion on the front side of the stator winding (coil), and numeral 16b designates the coil end portion on the rear side of the stator winding (coil). Numeral 25 designates an insulting resin (varnish), and numeral 25a designates a continuous portion of the insulting resin (varnish) within the slots.

As shown in FIG. 4, the outermost circumference of the coil end portions 16a and 16b resides on the side of the inner circumference For the base (core back) 15a. A predetermined amount of insulating resin (varnish) is retained due to a surface tension of the insulting resin (varnish) from the outer circumferential side of the end portion of an axial direction of the stator iron core (core) 15 up to the vicinity of the bottom of the outermost circumferential portion of the coil end portion.

The insulating resin (varnish) to be applied can be retained because the insulating resin possesses a predetermined viscosity (surface intension larger than the insulting varnish having been conventionally used). However, the reliable retention of an insulating resin can be preferably achieved by the method of applying the same only to the bottom portion once again in the coating process.

Thus, a larger amount of insulating resin (varnish) can be retained at the end of an axial direction of the stator iron core (core) 15 than in the remaining coil end portions, and the slots are also filled with the insulating resin.

Furthermore, heat, which is generated by the stator 8 consisting of the stator iron core (core) 15 and the stator winding (coil) 16, is conducted to the front bracket 1 or the rear bracket 2 as well to be cooled.

Accordingly, from the viewpoint of a cooling effect, a larger thermal conductivity of an insulating resin is more preferable.

Temperature of the stator winding (coil) at the time of normal operation of the on-vehicle AC generator is approximately 240° C. As a result of carrying out the test at a high temperature of 240° C., the following results were found.

In the case where coefficient of viscosity is not more than 400 pas, a thermal conductivity remarkably drops over the course of hours (for example, 100 hours).

Therefore, cooling capability of the stator winding (coil) gets worse.

In addition, in the case where coefficient of viscosity is not less than 800 pas, reduction in thermal conductivity under the condition of being left as it stands at a high temperature comes to be smaller. However, moldability of resin becomes low.

Moreover, when continuing the test of leaving as it stands at a high temperature, tenacity (toughness) in the very properties of the material was reduced leading to possibility of occurrence of crack due to vibration.

As a result, an insulating resin having 400–800 pas in coefficient of viscosity as well as not less than 2.0 w/mk in thermal conductivity is the most preferable.

As described above, the on-vehicle AC generator according to this first embodiment comprises:

a shaft 6 rotatably supported in a case 3 consisting of a front bracket 1 and a rear bracket 2;

a rotor 7 fixed to the shaft 6; and a stator 8 including a cylindrical stator iron core 15 in which a plurality of slots 15c extending in axial direction of the shaft 6 are formed so as to be aligned circumferentially, and which is fitted to and supported in the case 3 so as to contain the rotor 7 therein; and a stator winding 16 consisting of multiphase AC windings, which are wound about the slot 15c of the stator iron core 15;

the on-vehicle AC generator being characterized in that:

the stator winding 16 of the stator 8 includes coil end portions 16a, 16b extending from two end faces in axial direction of the stator iron core 15; and an insulating resin 25 having adhesive properties is applied to an entire surface of the coil end portions 16a, 16b; as well as a corner portion formed by intersection of an outer circumferential surface of a bottom of the coil end portions 16a, 16b and an end face of an axial direction of the stator iron core 15 is also filled with the insulating resin 25 having adhesive properties.

As a result, a steel plate at an axial end portion of a steel plate laminate end, serving as a fitting and supporting portion of the stator iron core 15, and the adhesive insulating resin 25 are integrally secured, thereby improving rigidity as a stator and enabling to prevent the stator 8 from deformation at the time of assembling or generating an electric power.

Further, in the on-vehicle AC generator according to this first embodiment, the place to be filled with the insulating resin 25 is a space where a cross section of the coil end portion is L-shape (i.e., corner portion), thus enabling an easy filling of a large amount of insulating resin.

Furthermore, in the on-vehicle AC generator according to this first embodiment, the slots 15c, which are formed in the stator iron core 15 of the stator 8, are filled leaving no space therein with the insulating resin 25 having adhesive properties. As a result, this filling leads to provision of the adhesive insulating resin that is continued in axial direction, sandwiching both end faces in axial direction of the stator iron core 15, eventually resulting in higher rigidity against radial force of the axial end portion of the stator iron core 15.

Additionally, in the on-vehicle AC generator according to the invention, the insulating resin having adhesive properties is continuous from one end to the other end of the stator iron core 15 within at least one slot. As a result, the presence of such insulating resin leads to provision of the adhesive insulating resin that is continued in axial direction within the slots going through axial length of the stator iron core 15, resulting in higher rigidity against radial force of the stator iron core 15 composed lamination of steel plates in axial direction.

Further, in the on-vehicle AC generator according to this first embodiment, the coil end portion 16a on a front side and the coil end portion 16b on a rear side, which protrude from both end faces in axial direction of the stator iron core 15, are continued with the insulting resin having adhesive properties via the slot 15c. As a result, the presence of such insulating resin leads to an integral structure with the insulating resins provided at both end faces of an axial direction, getting through an axial length of the stator iron core 15 resulting in a higher rigidity against radial force of the stator iron core 15 composed by laminating steel plates in axial direction.

Furthermore, in the on-vehicle AC generator according to this first embodiment, the end portion of the stator iron core 15 is filled radially with a larger amount of insulating resin than in the coil end portion thereby leading to a higher rigidity in radial direction. In addition, the end face of the stator iron core is covered with the insulating resin resulting in a larger effect of prevention from corrosion.

Finally, in the on-vehicle AC generator according to this first embodiment, since the insulating resin having adhesive properties possesses 400–800 pas of coefficient of viscosity and not less than 2.0 W/MK of thermal conductivity, a high cooling performance is achieved.

Embodiment 2

Figure 5:
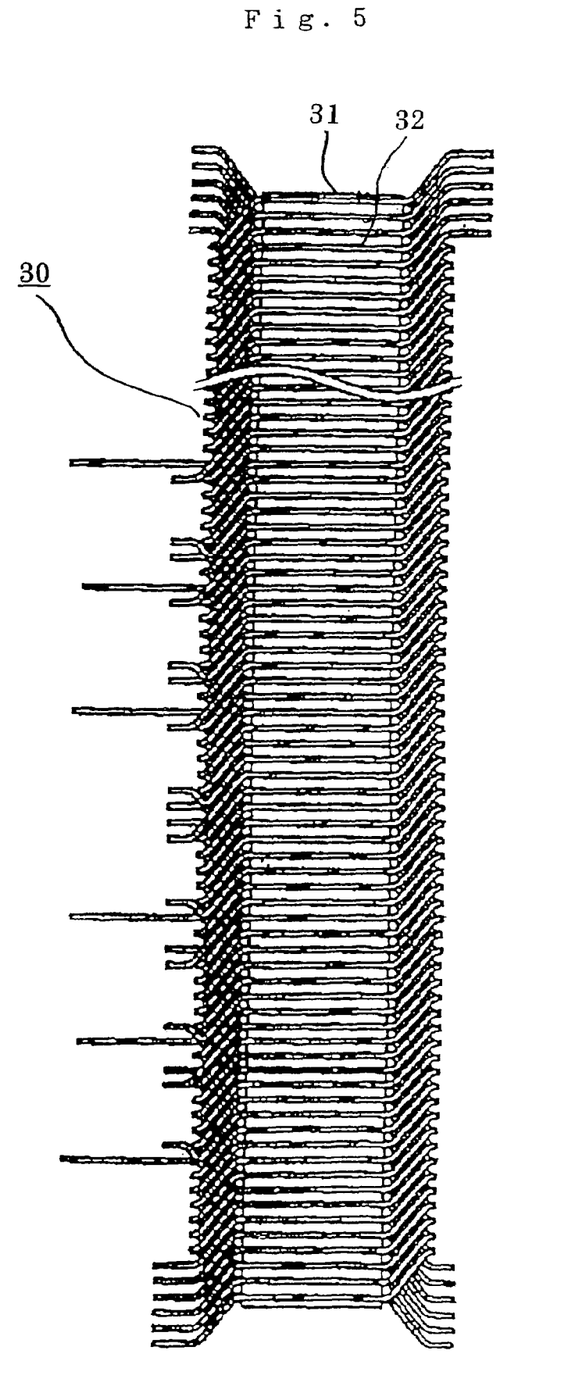
FIG. 5 is a plan view for explaining the state that a strand group constructing a stator winding is mounted on a stator iron core in a stator applied to an on-vehicle AC generator according to a second preferred embodiment.

FIG. 5 is a plan view showing a state that a strand group (coil ASSY) 30 constructing a stator winding (coil) for use in a on-vehicle AC generator according to a second preferred embodiment is mounted on a stator iron core (core).

As shown in FIG. 5, the coil ASSY 30 according to this second embodiment is made by folding, in the same manner, a continuous conductive strand at a pitch of one slot to form a planate coil ASSY, and overlapping three patterns of planate coil ASSYs to form a straight (rectangular parallelepiped-shaped) core configuration.

These coil ASSYs are inserted into a slot 32 opening at a predetermined pitch on one side orthogonal to a laminating direction of the straight (rectangular parallelepiped-shaped) laminated core 31 to form a circular pipe by bending so that a slot opening may face a center of the cylinder, and the end portions of the core are coupled by butt welding. Thus, the stator 8 is manufactured.

Further, the above-described manufacturing method of the stator 8 is described in detail in the paragraphs 0032 to the paragraph 0033 of the mentioned Japanese Patent No. 3256696.

Figure 6:
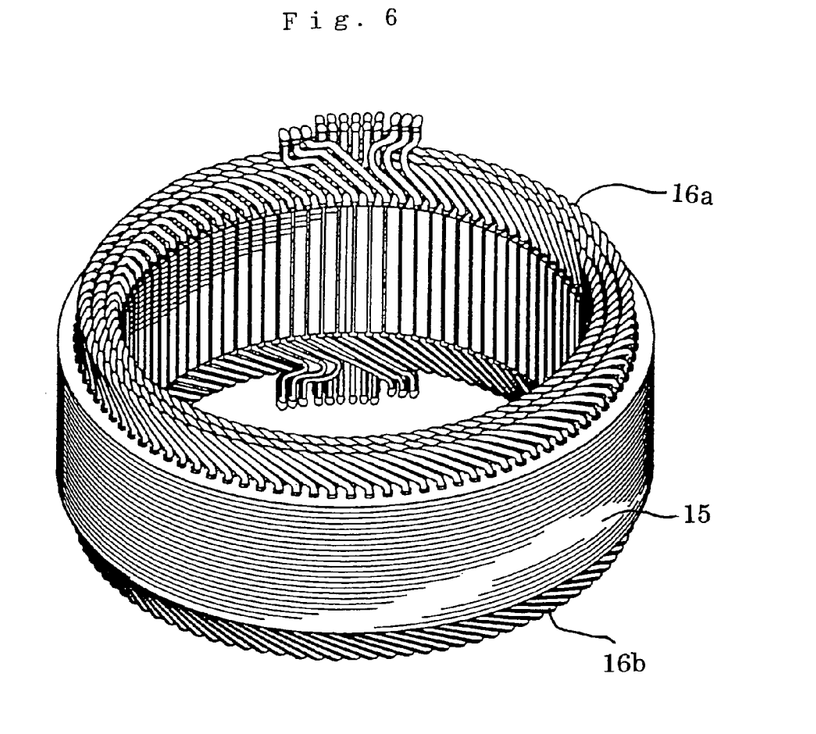
FIG. 6 is a perspective view before application of the insulating resin of the stator applied to the on-vehicle AC generator according to the second embodiment.

FIG. 6 is a perspective view before application of an insulating resin to a stator for use in the on-vehicle AC generator according to this second embodiment.

As shown in the drawing, a coil end portion 16a, 16b protruding in axial direction from the stator iron core (core) 15 is constructed of strand turn portions. In addition to an identically-shaped feature of an strand turn in itself, configuration, protrusion length and the like of the front and rear coil ends 16a, 16b are substantially the same resulting in a high alignment of the coils in circumferential and radial directions.

Specifically, the coil groups are formed uniformly at a slot pitch in circumferential direction, and three sets of coil ASSYs are stacked or overlapped in radial direction thereby achieving a high alignment.

In such construction, an insulating resin portion at the bottom of the coil end is likely to be formed uniformly in circumferential direction, whereby the stator less likely to deform owing to the fitting to a bowl-shaped bracket can be obtained.

The stator according to this second embodiment is an example of improvement in the method for inserting the winding into a large number of slots of the cylindrical stator iron core (core)15. Owing to the construction provided through the following steps: the coil ASSY is inserted into the laminate rectangular parallelepiped core to be an integral structure; thereafter the core is made cylindrical; and the butt portions are welded, there are some cases of poor withstand resistance to force applied in radial direction as compared with the case of the foregoing first embodiment. However, by filling an insulating resin (for example, varnish) at the end portions in axial direction of the stator iron core (core) and at the coil end bottom, a highly reliable stator iron core (core) can be obtained.

Furthermore, the foregoing first embodiment is an example of the stator having an outside dimension of 135Φ and in which 72 slots are formed, while the second embodiment is an example of the stator having substantially the same outside dimension in which 96 slots are formed. In spite of a stator provided with a large number of slots like this, implementation of idea according to this second embodiment ensures strength at the time of the fitting, and suppresses the possible subsequent deformation.

As described above, in the on-vehicle AC generator according to this second embodiment, the insulating resin having adhesive properties is continued from one end to the other end in axial direction within at least n (n≧3) points of slots in the stator iron core. As a result, rigidity in radial direction of the cylindrical stator iron core ASSY is ensured.

Further, in the on-vehicle AC generator according to this second embodiment, the mentioned n points of slots are located uniformly all round the cylindrical stator iron core. As a result, rigidity in radial direction of the cylindrical stator iron core ASSY is uniformly ensured in circumferential direction.

Furthermore, in the on-vehicle AC generator according to this second embodiment, the stator windings 16 are aligned at the coil end portion 16a, 16b. As a result, the insulating resin filled into the bottom of the coil end portion is uniformly located thereby improving the balance as a stator.

Embodiment 3

Figure 7:
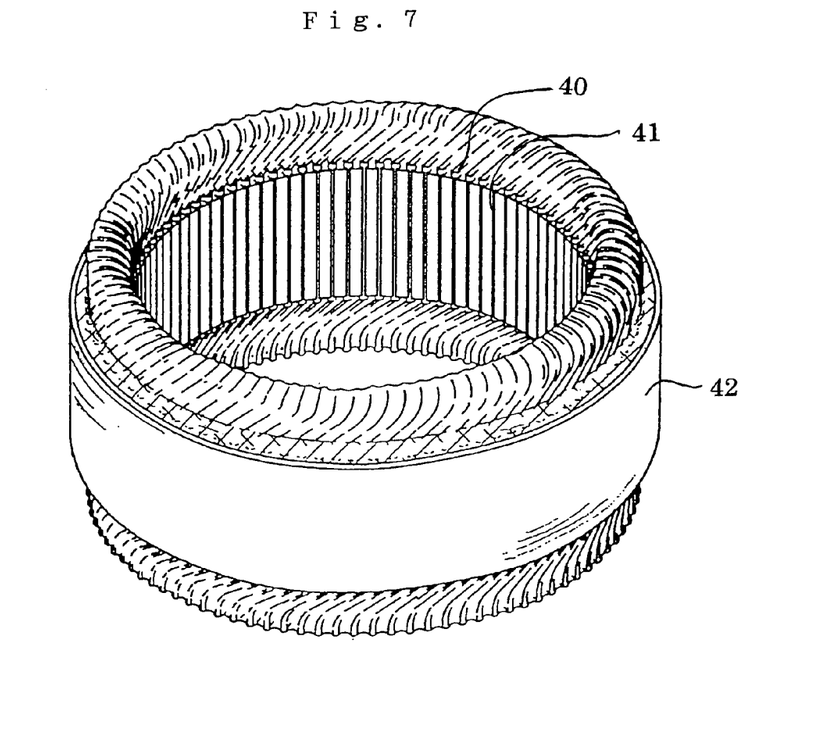
FIG. 7 is a perspective view for explaining structure of a stator applied to an on-vehicle AC generator according to a third preferred embodiment.

FIG. 7 is a perspective view for explaining structure of a stator for use in a on-vehicle AC generator according to a third preferred embodiment.

In the foregoing second embodiment, a stator coil to be inserted into the stator iron core (core) is a continuous wire. However, a stator coil made in the following way is applicable to what is to be a continuous winding in the state of being mounted on the core. Both ends of a plurality of short coil strips 40 are inserted into two slots 41 spaced a predetermined pitch apart respectively, and one end of the coil and one end of the other predetermined coil are connected together resulting in the continuous winding mounted with the core.

A filling process of the resin and appearance of the core ends are likewise to the foregoing second embodiment.

A multi-slot stator likewise to the second embodiment can be achieved in a cylindrical core 42.

That is, a stator can be fabricated without the steps of inserting the coil into the slots of the rectangular parallelepiped-shaped stator iron core (core) and forming it into a cylindrical configuration.

Embodiment 4

Figure 8:
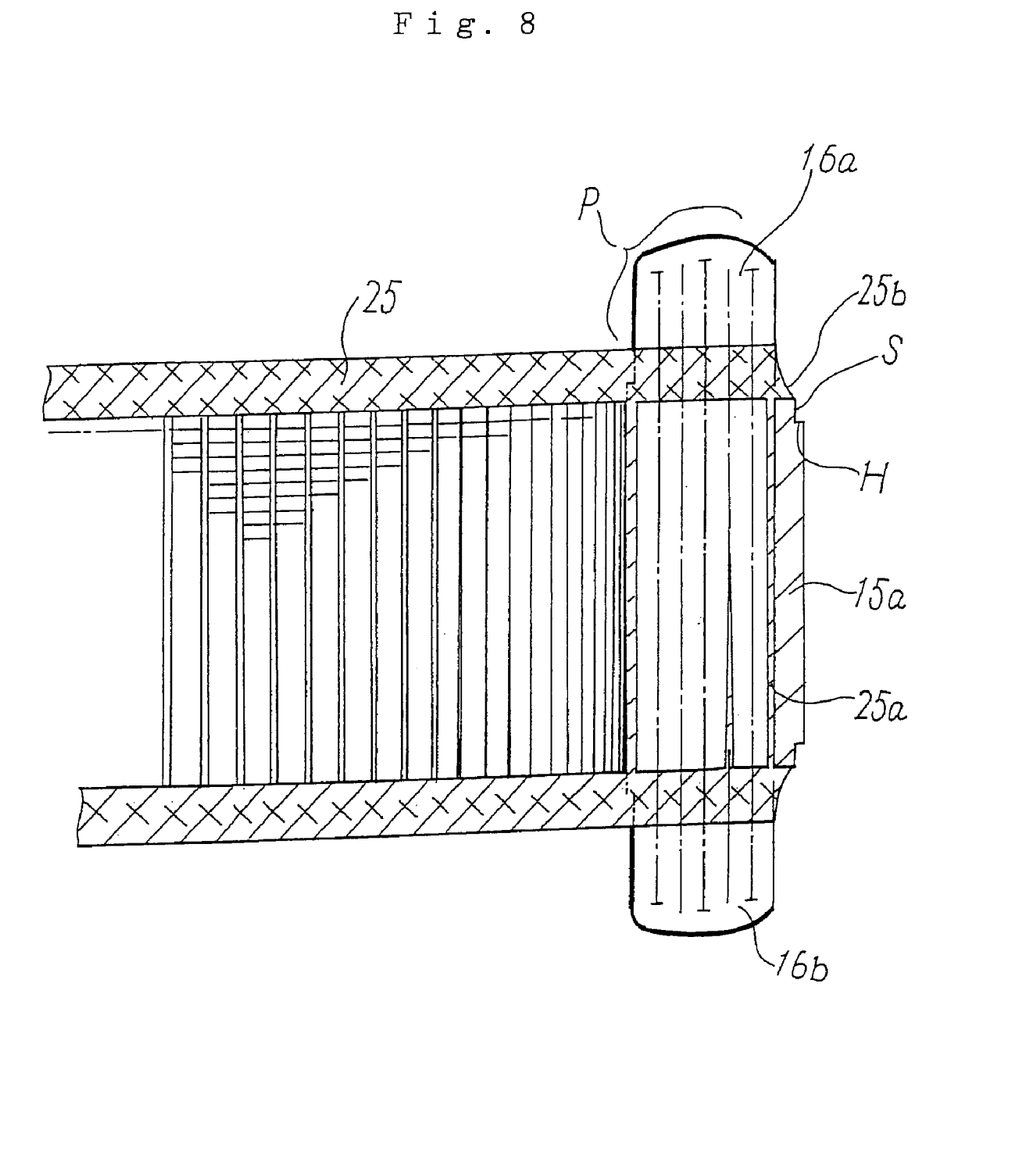
FIG. 8 is a view showing a state that the insulating resin is filled into the bottom of a coil end and in voids within a slot in a stator applied to a on-vehicle AC generator according to a fourth preferred embodiment.

FIG. 8 is a cross sectional view conceptually showing a state that a coil end bottom and voids within slots are filled with an insulating resin (varnish) in a stator of a on-vehicle AC generator according to a fourth preferred embodiment.

Figure 9:
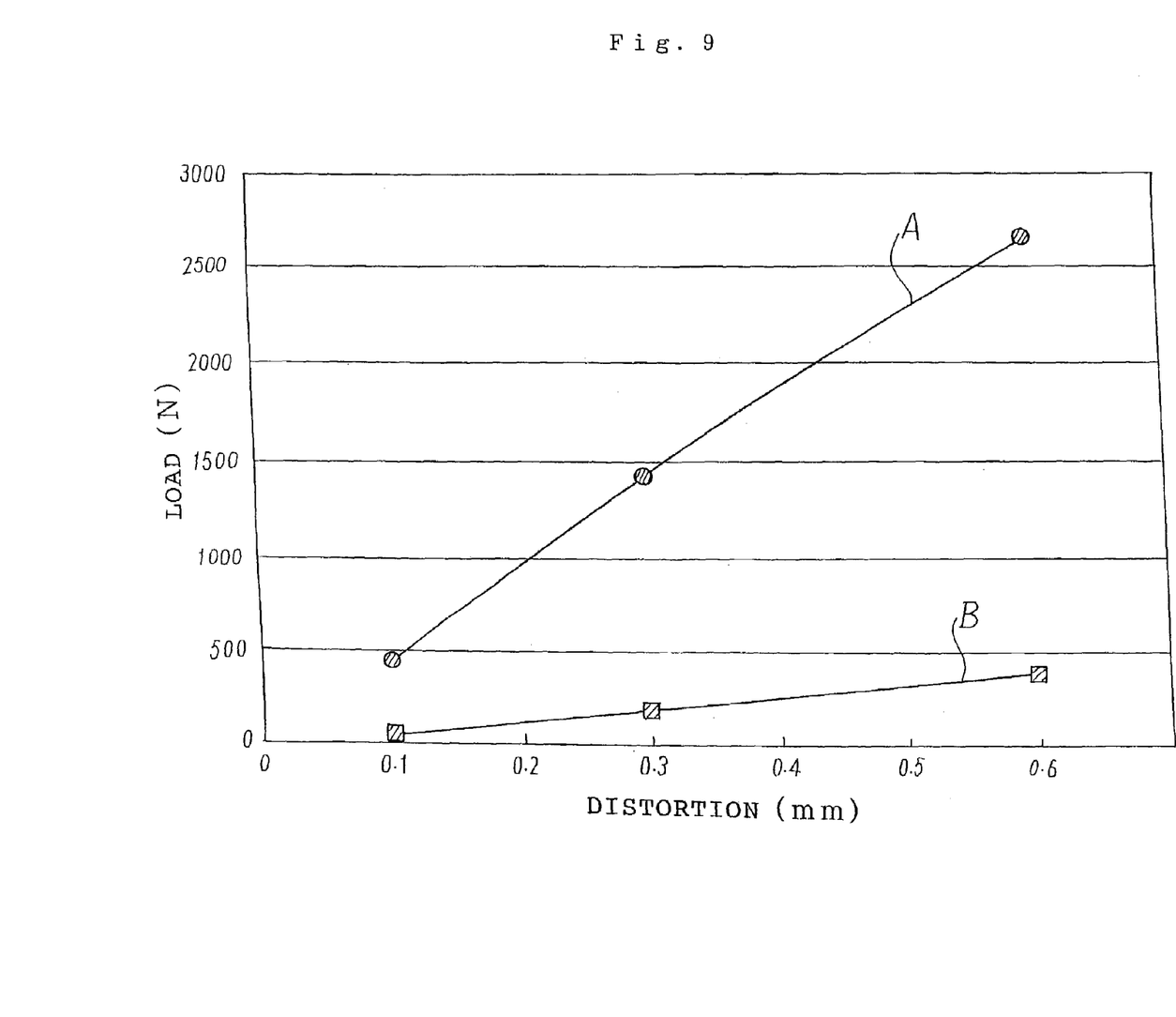
FIG. 9 is a chart for explaining rigidity of the stator applied to the on-vehicle AC generator according to the fourth embodiment.

Further, FIG. 9 is a rigidity comparison graph comparatively showing rigidities between a case where any insulating resin having adhesive properties is filled into the stator of the on-vehicle AC generator according to the this embodiment (that is, in the case of the fourth embodiment) and the other different case.

As shown in FIG. 8, both end portions of an axial direction of the base 15a, being an outer circumferential portion of the cylindrical stator iron core (core) 15, are machined by step machining in order to fit and position the bracket after filling the stator with the insulating resin.

With reference to FIG. 8, numeral 25 designates an insulating resin, numeral 25a designates a continuous portion of the insulating resin within the slots, and numeral 25b designates an R portion of the insulating resin. The insulating resin 25 to be filled into the coil end bottom is provided spreading to the outer circumferential side at the end portions of an axial direction of the stator iron core (core), and further comes to form a smooth R-shape as indicated by the numeral 25b.

As described above, since the insulting resin is machined by cutting after the filling, the end face of an axial direction of the stator iron core (core) is covered with the insulating resin up to the outside diameter edge resulting in no exposed surface. The insulating resin having high adhesive properties is retained all over the end face in axial direction of the stator iron core (core) thereby enabling to obtain a sufficient rigidity.

The insulating resin is applied like this, thereby enabling to keep rigidity even if an end portion of an axial direction of the stator iron core (core) is machined by step machining. Further the insulating resin is retained all over the end face, thereby enabling to suppress the generation of corrosion.

Furthermore, a partition (wall) P is provided from the bottom of the inside circumference of the coil end to an axial end of the coil end, whereby a predetermined varnish is easily retained in full measure at the corresponding portions, thereby speeding up a filling operation of the insulating resin.

FIG. 9 is a graph for comparing rigidity of the stator filled with an insulating resin according to this fourth embodiment and that of a stator in the case of not being filled with the insulating resin.

With reference to the drawing, A is a graph indicating rigidity of the stator according to this fourth embodiment. B is a graph indicating rigidity of a stator in the case of not being filled with the insulating resin.

As is obvious from the graph, the stator according to this fourth embodiment shows a large rigidity, and is found to be less likely to deform against pressure applied, e.g., at the time of an assembly operation.

As described above, in the on-vehicle AC generator according to this fourth embodiment, the fitting and supporting portion of the stator iron core 15 with the case 3 is machined by step machining. As a result, although a smaller amount of rustproof coating is applied than the other portion, the insulating resin is reliably filled into the bottom of the coil end and the axial end portion of the core. Consequently, rigidity at the time of the fitting and thereafter is kept, and the laminate is suppressed from deformation, thereby enabling to obtain a high-quality article without any portion spreading the corrosion.

In the on-vehicle AC generator according to this fourth embodiment, a wall made of other material is provided at an inner circumferential portion of the coil end. As a result, volume of the insulating resin to be filled into the bottom portion of the coil end can be easily increased.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An on-vehicle AC generator comprising:
   a shaft rotatably supported in a case;
   a rotor fixed to said shaft; and
   a stator including a cylindrical stator iron core in which a plurality of slots extending in axial direction of said shaft are formed so as to be aligned circumferentially, and which is fitted to and supported in said case so as to contain said rotor therein, and a stator winding consisting of multiphase AC windings which are wound about said slots of said stator iron core;
   wherein said stator winding of said stator includes coil end portions extending from two end faces in axial direction of said stator iron core, and
   an insulating resin having adhesive properties is applied to an entire surface of each of said coil end portions leaving a space between an outer circumferential surface of said coil end portions and an inner circumferential surface of said case, as well as a corner portion formed by intersection of an outer circumferential surface of a bottom of said coil end portions and an end face in axial direction of said stator iron core is also filled with said insulating resin having adhesive properties at a portion adjacent to a stator supporting portion provided at the bottom of said coil end portions,
   wherein the end portion of said stator iron core is filled with a larger amount of insulating resin radially than said coil end portions.

2. The on-vehicle AC generator according to claim 1, wherein the slots, which are formed in the stator iron core of said stator, are filled leaving no space with the insulating resin having adhesive properties.

3. The on-vehicle AC generator according to claim 1, wherein the insulating resin having adhesive properties is continued from one end to the other end of said stator iron core within at least one slot.

4. The on-vehicle AC generator according to claim 1, wherein an coil end portion on a front side and a coil end portion on a rear side, which extend from both end faces in axial direction of said stator iron core, are continued with the insulating resin having adhesive properties via the slot.

5. The on-vehicle AC generator according to claim 1, wherein the insulating resin having adhesive properties is continued from one end to the other end in axial direction within at least n (n≧3) points of slots in said stator iron core.

6. The on-vehicle AC generator according to claim 5, wherein said n points of slots are located uniformly all around the cylindrical stator iron core.

7. The on-vehicle AC generator according to claim 1, wherein said stator winding is aligned at the coil end portions.

8. The on-vehicle AC generator according to claim 1, wherein the fitting and supporting portion of said stator iron core with said case is cut more by machining than other portions of the stator iron core.

* * * * *